Oct. 25, 1949.    G. H. NORQUIST    2,485,649
APPARATUS FOR FLANGING METAL
CLAD FIBROUS BASE PANELS
Filed Sept. 26, 1947    3 Sheets-Sheet 2
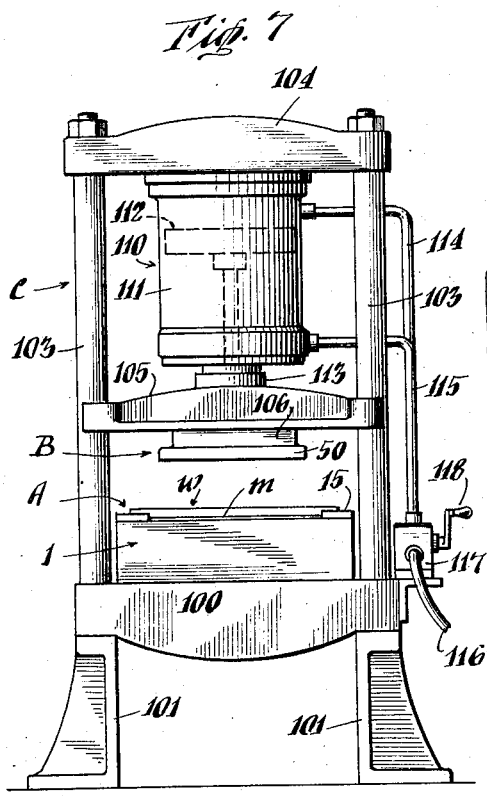
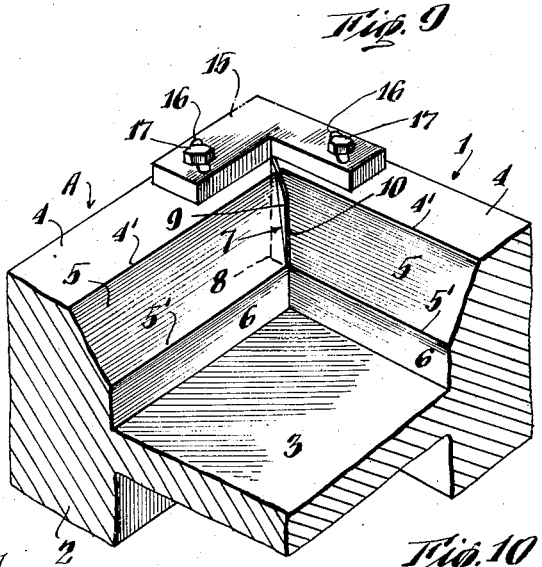
INVENTOR.
Glenn H. Norquist
BY Austin Wilhelm Carlson
ATTORNEY

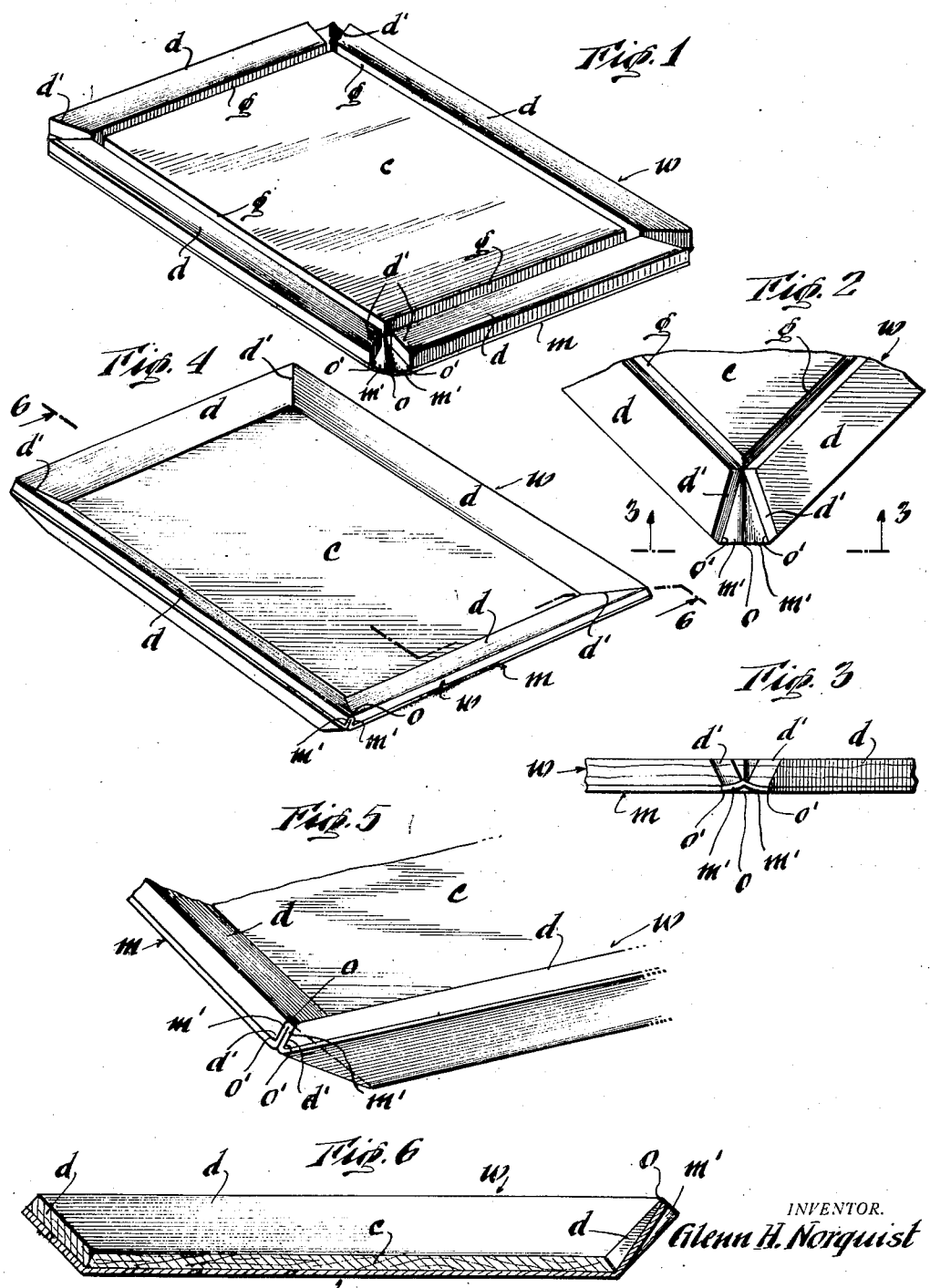

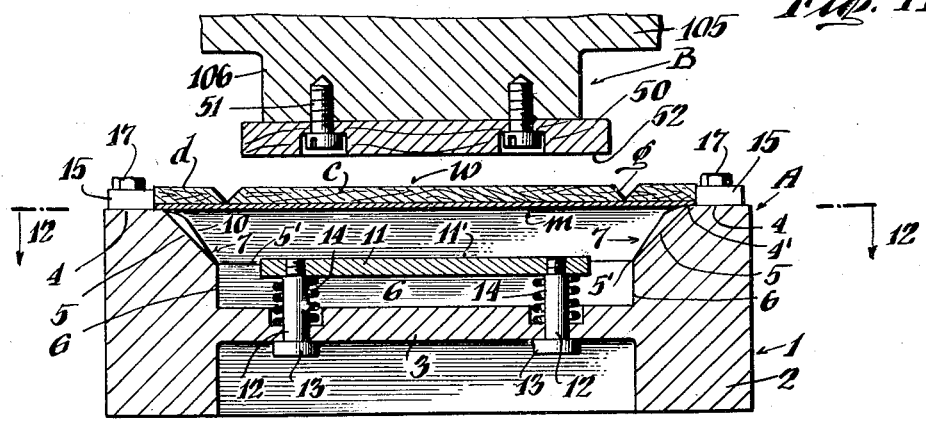
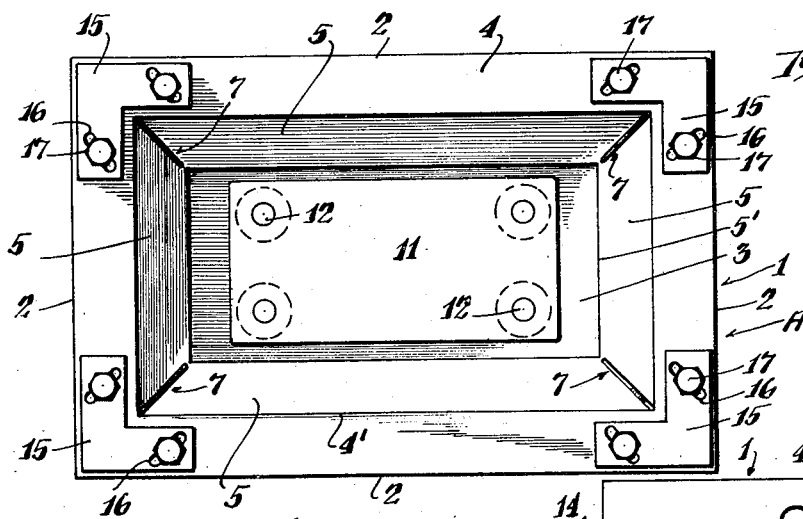
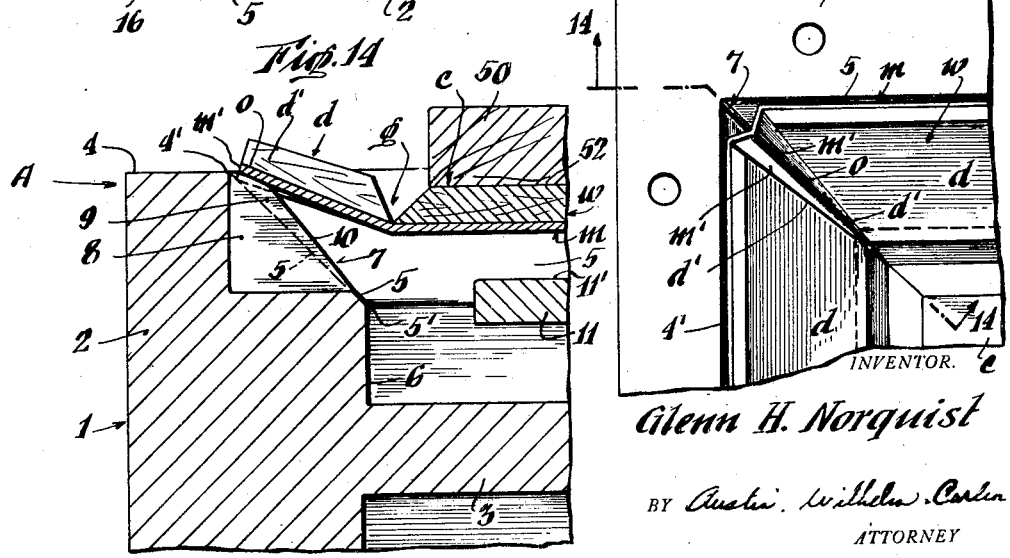

Patented Oct. 25, 1949

2,485,649

UNITED STATES PATENT OFFICE 2,485,649

APPARATUS FOR FLANGING METAL CLAD FIBROUS BASE PANELS

Glenn H. Norquist, Jamestown, N. Y.

Application September 26, 1947, Serial No. 776,298

7 Claims. (Cl. 153—23)

1

This invention relates to apparatus for flanging metal clad fibrous base panels, and more particularly to an improved mechanism for flanging and ribbing metal clad panels. This application is a continuation-in-part of my copending application Serial Number 561,389, filed November 1, 1944, issued as Patent No. 2,439,397 on April 13, 1948.

Metal clad panels, comprising a base sheet formed of wood, plywood, fiberboard or other base material having a metal sheet secured to one side thereof, possess qualities which make them highly adapted and useful for fabrication into table tops, shelving, cabinets, counters, packing cases, and like products. In the fabrication of such products from metal clad panels, it is often necessary to form flanges on such panels which extend along two or more sides thereof.

Preparatory to the flanging operation, it is customary to cut grooves in the base sheet and notch out the corner of the panel so as to permit the flanges to be formed by bending the metal sheet along a line coincident with the grooves formed in the base sheet. Heretofore, the corner notch has been cut completely through both the base sheet and the metal sheet so that when the flanges are formed the free ends thereof will meet substantially in abutment. The adjacent ends of the metal flanges must then be welded or soldered together. Such a corner construction is relatively weak since the ends of the flanges are held together solely by the strength of the weld or solder seam.

In accordance with this invention. the metal clad panel is prepared for the flanging operation by forming a V-notch in the corner of the base sheet only, leaving the exposed corner metal uncut and unweakened. A crimp is then formed in the uncut and unweakened corner section of the metal sheet, the crimp being characterized by fold defining lines in the corner metal along which the metal corner section will fold during the flanging operation to provide a plural ply reinforcing rib at each corner of the flanged panel. The plural ply reinforcing rib is so formed that the same will be wedged between the adjacent ends of the adjacent flange sections of the base sheet, forming a strong and sturdy corner construction. The plural ply metal reinforcing rib may be seam-welded so that it will maintain its preformed shape and further enchance the corner strength of the flanged panel.

This invention more particularly relates to a method and mechanism for flanging metal clad

2 panels and to the formation of plural ply metal reinforcing ribs at the corners thereof during and substantially simultaneously with the flanging operation. The mechanical devices which preform these operations are preferably attached to a mechanically operated press of a type commonly used in metal working. These devices include a bed plate which is suitably attached to and supported by the fixed bed block of the press. The bed plate supports a shaping frame presenting side forming and corner forming faces arranged to receive the metal clad panel to be flanged therebetween. A pressure block is fixed to the upper reciprocating member of the press and is shaped and arranged to telescope into the area between the forming faces of the shaping frame therebelow and to exert pressure on the center or facing section of the panel as the panel is telescoped into the space defined by the shaping frame. The forming surfaces of the shaping frame operate to shape the flanges of the panel to the desired contour as the panel is driven by the pressure block into the shaping frame.

As a further improvement, relatively thin knife-like elements are set to extend inwardly from the corner forming surfaces of the shaping frame. These knife-like elements operate to positively insure inward folding of the crimped corner sections of the metal sheet along the fold-forming lines therein, so that each metal corner section will be neatly shaped into a tightly folded reinforcing rib defined by connected rib forming elements extending substantially in parallelism and projecting inwardly between the adjacent ends of the flange section of the base sheet. The corner ribs take shape as the metal clad panel is pressed into the space defined by the forming faces of the shaping frame. The ribs are completely formed and the flanges shaped to the desired contour, when the upper pressure block has completed its downward travel. The shaping frame is desirably provided with a false bottom comprising a resiliently mounted bottom plate which operates to automatically eject the formed and flanged metal clad panel from its pressed position in the shaping frame when the upper pressure block is lifted free of the panel.

In performing the flanging operation, the metal clad panel is first prepared by providing grooves or cuts in the base sheet thereof which define the flanging sections and the center or facing section of the panel. The corner or corners of the base sheet are notched out in the proper manner to form inclined ends on the flange sections of the base sheet, and the exposed corners of the metal sheet are crimped to provide the proper fold forming lines therein. The metal clad panel which has thus been grooved, notched and crimped, is placed to rest upon the upper ledge of the shaping frame and properly centered with respect to the shaping faces thereof. As the metal clad panel is driven into the shaping frame by the application of pressure exerted on the center section thereof by the reciprocable pressure block, the flanges and corner ribs are fully formed by a single downward stroke of the pressure block, which may be manually or power-operated.

By associating this improved flanging and ribbing mechanism with a power-operated mechanical press, metal clad panels may be flanged and ribbed at high production speeds by a single press operator. The forming faces of the shaping frame may be made of tool steel, are relatively simple in design, and can be easily made by a toolmaker. The pressure block is preferably made of wood and is provided with suitable means for firm attachment thereof to the reciprocating member of a press. Shaping frames of different types and forms may be interchangeably and removably attached to the bed plate in accordance with the shape and size of the flanged panel to be formed. The forming surfaces of the shaping frame are accurately shaped and contoured in conformity with the desired contour of the flanges to be formed. This novel mechanism not only operates to accurately form the panel flanges and the corner ribs, but further operates to firmly press the ends of the flange sections of the base sheet firmly against the formed corner ribs projected therebetween, so that the flanged panel is completely and fully formed in a neat and attractive manner in a single operation.

An object of this invention is to provide an improved mechanism for flanging metal clad panels with precision and accuracy with a minimum of labor and at low cost.

Another object of this invention is to provide an improved automatic mechanism adapted to operate upon metal clad panels and form one or more flanges and substantially simultaneously form one or more corner reinforcing ribs therein, means being provided to insure neat and accurate shaping of the inturned corner ribs.

A further object of this invention is to provide an improved mechanism for forming flanges and corner ribs in metal clad panels which is strong and sturdy in construction, simple and foolproof in operation, and which is adapted to form said flanges and ribs accurately and at high production speeds.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which Fig. 1 is a perspective view of the metal clad panel as it appears when prepared for flanging and ribbing, the panel having grooves and corner notches formed in the base sheet, and crimp forming fold lines formed in the corner sections of the metal which is attached to the base sheet.

Fig. 2 is an enlarged fragmentary top plan view of a corner portion of the prepared metal clad panel shown in Fig. 1.

Fig. 3 is an enlarged fragmentary edge view of the prepared metal clad panel as the same appears when viewed along line 3—3 of Fig. 2.

Fig. 4 is a perspective view of the metal clad panel as it appears when flanged and ribbed.

Fig. 5 is an enlarged fragmentary perspective view of a corner portion of the flanged panel showing particularly the construction of the corner rib formed from the crimped corner section of the unbroken metal liner sheet.

Fig. 6 is a transverse cross-sectional view of the flanged panel as it appears when viewed along line 6—6 of Fig. 4.

Fig. 7 is a diagrammatic front elevational view of a mechanically operated press having the improved flanging and ribbing attachments associated therewith.

Fig. 8 is an enlarged fragmentary cross-sectional view showing a part of the bed frame and the reciprocating frame of the press having the improved shaping frame and pressure block associated therewith as the same would appear on completion of the panel shaping stroke.

Fig. 9 is an enlarged fragmentary perspective view showing a corner portion of the shaping frame and the corner folding knife associated therewith.

Fig. 10 is an enlarged fragmentary plan view of the shaping frame shown in Fig. 9, this view also illustrating the manner in which the corner folding knife operates to positively form the inturned rib from the exposed metal corner section of the metal clad panel being flanged.

Fig. 11 is a vertical cross-sectional view of the shaping frame and associated pressure block in relatively separated position, with the prepared metal clad panel placed in supporting position on the shaping frame in readiness for the flanging operation.

Fig. 12 is a top plan view of the shaping frame as the same would appear when viewed in the direction of the arrows along line 12—12 of Fig. 11.

Fig. 13 is an enlarged fragmentary plan view of a corner section of the shaping frame showing the corner section of the metal sheet in the process of being shaped into rib formation under the influence of the corner folding knife; and Fig. 14 is an enlarged fragmentary cross-sectional view of the shaping frame and associated pressure block in the process of flange shaping the metal clad panel positioned therebetween as the same would appear when viewed along line 14—14 of Fig. 13.

Similar reference characters refer to similar parts throughout the several views of the drawings and specification.

The metal clad panel as prepared for flanging and ribbing is illustrated more particularly in Figs. 1 and 2. The prepared panel is formed essentially from a base sheet $w$ of such material as wood, plywood, or fiberboard having a metal sheet $m$ firmly bonded thereto. The prepared panel is provided with grooves $g$ cut into the base sheet $w$, which meet or intersect at points adjacent the corners of the panel so as to divide the panel into a main or center section $c$ and flanged sections $d$. Each corner of the base sheet has a V-shaped cut-out so formed so as to provide the flanged sections $d$ thereof with mitered ends $d'$, leaving exposed a corner section $m'$ of the metal facing sheet. Each metal corner section $m'$ is crimped so as to provide a raised ridge or folding line o extending midway between the adjacent ends d' of the flanged sections d of the base sheet. Fold lines o' are also formed in each corner section of the metal sheet, the folding lines o' extending parallel with and directly adjacent to the respective free ends d' of the flanged section d of the base sheet. Thus it will be observed that the crimp formed in the corner section is characterized by converging fold forming lines o and o' which divide the exposed corner section m' of the metal sheet into two similar triangular segments, which may be collapsed together in substantially parallel extending relationship as shown in Fig. 5 by the mechanism more particularly hereafter described to provide an inwardly extending plural ply rib which substantially reinforces the corner construction of the finished flanged panel.

The mechanisms and attachments for flanging and corner ribbing the prepared metal clad panel illustrated in Fig. 1 and above described, may be generally described as comprising a forming and shaping assembly A which cooperates with a pressure applying assembly B which may be associated with a suitable mechanical press C, as shown in Figs. 7 and 8, to support the forming and shaping assembly A and to reciprocate the pressure applying assembly B in a manner under the control of the operator. The forming and shaping assembly A, as illustrated in Figs. 8 to 14 inclusive, comprises a heavy shaping frame 1, which rests upon and is suitably removably secured to the bed plate 100 of the press C. The bed plate 100 of the press may be supported upon staunch legs 101 resting on the factory floor. The press comprises mechanisms positioned above the shaping frame 1 for reciprocating the pressure applying assembly B, which comprises essentially a pressure block 50 positioned above and cooperating with the flange forming and rib forming mechanism associated with the shaping frame 1.

The shaping frame 1 is desirably made from metal such as tool steel and may be made substantially in one piece. The shaping frame may comprise a strong and heavy enclosing wall section 2 whose lower end is supported upon and secured to the bed plate 100 of the press. The enclosing wall section 2 is generally of such size and shape as to conform to the panel to be flanged. The opening defined by the enclosing wall section 2 is closed by a bottom wall section 3 which may be formed integrally therewith, as shown more particularly in Figs. 8, 9 and 11. The upper face of the enclosing wall section 2 presents a relatively flat horizontally extending ledge 4.

The shaping frame 1 presents inner forming faces 5 which closely conform to the angularity of the panel flanges to be formed. The forming faces 5 are shown in the drawings as inclined at an angle of approximately 45° to effect the formation of flanged panels whose flange sections d are inclined approximately 45° to the plane of the center section c thereof. It will be appreciated, however, that the flange sections d may be formed at any desired degree of inclination to the main section c of the panel by giving the forming faces 5 a corresponding inclination. The lower edge 5' of the inclined forming faces 5 terminates in a substantially vertical riser face 6 which extends down to the upper face of the bottom wall section 3. The inclined forming faces 5 meet the flat ledge face 4 of the shaping frame along a relatively sharp but non-cutting bending edge 4'.

Knife-like corner folding elements 7 are set between the adjacent corner ends of the inclined forming faces 5 in the manner shown more particularly in Figs. 8 to 14. Each knife-like element 7 is preferably formed of tool steel and presents an inset portion 8 which is snugly seated and secured within a conforming seam cut diagonally in the upper portion of the enclosing wall section 2 of the shaping frame, leaving a projecting portion 9 extending diagonally inwardly between the adjacent ends of the inclined forming faces 5. The free edge 10 of each knife-like folding element 7 is tapered longitudinally thereof to present a contour substantially as shown in Fig. 14, and is so shaped and positioned as to seat against the outside face of the bend line o of the crimped corner section of the metal facing sheet of the panel. Similar knife-like folding elements may be located at each inside corner of the shaping frame, accurately located to insure neat formation of the inturned reinforcing ribs of the panel being fabricated.

The shaping frame 1 is so formed that the riser surfaces 6 thereof closely conform to the bend line g of the panel to be flanged, or otherwise stated, to the edges of the center section c of the flanged panel to be formed. The flat prepared panel is placed to rest upon the flat ledge 4 of the shaping frame as shown in Fig. 11. Suitable panel aligning blocks 15 may be located to project upwardly from the horizontal ledge 4 of the shaping frame to facilitate placement and accurate registration of a prepared panel when placed in position upon the shaping frame as shown in Fig. 11. The panel aligning blocks 15 may be generally angular in form and located at the corners of the shaping frame, and adjustably secured thereto by set bolts 17 which extend through diagonally extending slots 16 provided in the aligning blocks.

It will be noted by referring to Fig. 11 that the flat prepared panel when properly registered in position upon the supporting ledge 4 of the shaping frame, will have only the flange sections d thereof in contact with the ledge surfaces 4, and will present the center section c thereof unsupported and extending over the area whose outline is defined by the lower edge 5' of the forming faces 5.

When downward pressure is exerted on the center section c of the prepared flat panel, as by the pressure block 50, the center section c of the panel is telescoped downwardly into the area or space defined by the forming faces 5 of the shaping frame. As downward pressure is exerted, the flange portions of the metal sheet will bend along a line coincident with the groove lines g formed in the base sheet. Substantially simultaneously, the inclined folding edges 10 of the folding knife elements 7 will press against the crimped corner sections of the metal panel sheet along the adjacent crimped fold lines o thereof, thereby insuring positive inward collapse of the crimped corner sections of the metal sheet. As the downward pressure is continued, the metal faces of the flange sections will follow and conform to the forming surfaces 5 of the shaping frame. When the outside face of the center section c of the panel being formed has reached the terminus edge 5' of the forming faces 5, the metal faces of the flanged sections d of the panel will be shaped in true conformity with the forming faces 5.

During shaping of the panel flanges, it will be noted that the metal corner sections $m'$ are forced to collapse inwardly along the bend defining lines $o$ and $o'$, which collapse is accentuated and positively assured by the initial pressure exerted by the free edge 10 of the knife-like corner folding elements 7. The forming faces 5 of the shaping frame also prevent the metal corner sections from expanding or bowing outwardly, once the inward collapsing action of the metal corner sections $m'$ has been positively initiated by the corner folding knife elements 7. Thus, even though the metal corner sections have not been accurately or fully precrimped so as to define the desirable sharp fold lines $o$ and $o'$ therein, positive and certain inward collapse of the metal corner sections to provide neat and compact inturned rib formations is at all times assured.

Since the inclined forming faces 5 are shaped to accurately surround the outer face surfaces of the flange sections $d$ to be formed, the panel being operated upon cannot crawl or shift out of place, and since the space defined by the inclined forming surfaces 5 of the shaping frame is gradually contracted in area as the center section $c$ is driven downwardly by the pressure block 50, the excess metal represented by the crimped corner sections $m'$ is forced to fold inwardly in the manner illustrated in Figs. 13, 14 and 8. The forming faces 5 of the shaping frame also transmit a pressure force in a direction extending toward the corner folding knife elements 7, so that when the outside face of the center section $c$ of the panel being flanged has been driven to extend in a plane defined by the lower edge 5' by the forming surfaces 5, the crimped metal corner sections will have been collapsed and folded into tight and compact inwardly extending ribs as illustrated in Fig. 5. It will be appreciated that the portions 9 of the knife-like folding elements project inwardly only a limited distance and only sufficient to positively initiate inward collapse folding of the crimped corner sections of the metal sheet, so that when the panel operated upon has been fully flanged and ribbed, the inward projecting knife portion 9 will not be wedged between the collapsed crimped portions $m'$ of the metal sheet.

To facilitate immediate ejection of the flanged and ribbed panel after the pressure exerted by pressure block 50 has been removed from the center section $c$ of the panel, the shaping frame 1 is desirably provided with a resiliently mounted ejection plate 11 having a top face 11' which extends over a substantial area of the outside face of the center section $c$ of the panel. As shown more particularly in Figs. 8 and 11, the ejection plate 11 is supported upon a plurality of guide studs 12 extending through suitable apertures in the bottom wall section 3 of the shaping frame, the upper end of each stud 12 being suitably secured to the ejection plate 11. The plate supporting studs 12 are desirably provided with a headed portion 13 to limit and define the telescoping movement of the studs. A compression spring 14 surrounds each of the studs 12 and is compressed between the ejection plate 11 and the adjacent bottom wall section 3 of the shaping frame.

When in operative position as shown in Fig. 11, the upper face 11' of ejection plate 11 is normally raised slightly above the plane defined by the lower edge 5' of the inclined forming faces 5 of the shaping frame. When the pressure block 50 has executed its full downward panel flanging stroke as shown in Fig. 8, the coil compression springs 14 will be compressed, and the upper horizontal surface 11' of the ejection plate 11 will extend in a plane below the lower edge 5' of the forming faces 5. Immediately upon the release of the pressure exerted by the pressure block 50 against the center section $c$ of the panel, the compressed coil springs 14 exert a substantial upward lifting force against the ejection plate 11 so as to positively "kick" the finished flanged panel upwardly out of its compressed position within the shaping frame, permitting convenient removal of the finished panel from the press.

The pressure applying assembly B, as shown more particularly in Figs. 7, 8 and 11, includes the pressure block 50 which is preferably formed of wood, and has a lower face area 52 which closely conforms to the center section $c$ of the flanged panel to be formed. The pressure block 50 may be reciprocated by any desired mechanical means, such as the mechanical press illustrated in Fig. 7.

The mechanical press shown in Fig. 7 comprises a pair of spaced upright standards 103, which rest upon and are secured to the base block 100 of the press, the standards being connected at their upper ends by a yoke frame 104. A slide frame 105 is arranged to reciprocate between the standard 103 below the yoke frame 104. The slide frame 105 may be provided with a block portion 106 to which the pressure block 50 may be secured as by means of suitable stud bolts 51. The lower face 52 of the wooden pressure block 50 has an area which substantially conforms to the area of the center section $c$ of the panel to be formed, and is substantially flat and smooth to snugly seat against the inside fibrous face of the panel section $c$.

The slide frame 105 may be reciprocated by any desired mechanism. As shown in Fig. 7 for purposes of illustration, power means 110 for reciprocating the slide frame 105 may comprise either an air or hydraulic cylinder 111 whose upper end is fixed to and supported by the yoke frame 104. The pressure cylinder 111 contains a suitable reciprocable piston 112 comprising a piston head and a piston shank, the piston shank projecting through the lower end of the cylinder 111 and is secured as by a suitable coupling member 113 to the slide frame 105. Compressed air or liquid under pressure may be used to reciprocate the piston 112. A pressure line 114 may be provided whose outlet end is connected to the upper end of the cylinder 111 to provide the driving power for the down-stroke of the piston 112. A pressure conduit 115 connected to the lower end of the cylinder 111 may be provided to supply the driving power for driving the piston 112 upwardly on its return stroke. The pressure lines 114 and 115 may lead into a suitable control box or two-way control valve 117 connected to a pressure supply line 116. The control box or valve 117 is provided with a suitable control lever 118 by means of which the press operator may accurately control the stroke movements of the piston 112 and the corresponding reciprocating movement of the pressure block 50.

To perform the flanging and ribbing operation, the operator places the preformed panel, as shown in Fig. 1, upon the horizontal ledge 4 of the shaping frame 1 with the metal face of the flange sections $d$ of the panel resting upon the ledge 4, and with the panel properly centered within the adjustable aligning blocks 15. The operator then operates the control lever 118 to drive the pressure block 50 downwardly in accurate registry with the center section c of the flanged panel to be formed. As the pressure block 50 moves downwardly, the flange sections d bend along the bend defining grooves g, and substantially simultaneously the knife-like corner bending elements 7 exert pressure against the crimped metal corner sections of the panel as shown in Figs. 13 and 14. The flanges of the panels take the shape of the forming surfaces 5 of the shaping frame, and the crimped metal corner sections are simultaneously folded inwardly to form compressed reinforcing ribs, as the center section c of the panel is driven downwardly by the pressure block 50. When the lower surface of the center section reaches the break line 5' of the shaping frame, flanging and ribbing of the panel is completed, and the adjacent mitered ends d' of the flanged sections d of the base sheet will have been pressed firmly against the compressed metal rib wedged therebetween. It is preferable to cut off the outer end of the corner metal m' of the panel to be formed, as indicated in Figs. 1 and 2, so that when the rib formations are completed, as shown in Fig. 5, no part of the metal corner rib will project above the top edge of the formed flanges.

When the pressure block 50 has fully completed its down stroke, the piston 112 is driven upwardly either by spring pressure exerted thereon, or by compressed air or hydraulic pressure which may be automatically supplied upon the completion of the down stroke by the provision of an automatically operated two-way control valve 117. When the pressure exerted by pressure block 50 against the center section c of the flanged panel is released, the ejection plate 11 will spring upwardly to eject the fully flanged and ribbed panel from its compressed position within the shaping frame.

By the use of the method and mechanisms above described, prepared metal clad panels can be flanged and ribbed with precision and accuracy at high production speed by relatively untrained operators. Several hundred panels may be flanged and ribbed per hour by a single operator without reliance upon skilled craftsmanship to insure neat and accurate workmanship. It will be appreciated that polygonal metal clad panels presenting any desired number of corners may be flanged and ribbed by the employment of a properly formed shaping frame. Flanges can be formed of any desired depth or inclination by providing a shaping frame having forming surfaces 5 of corresponding depth and shape.

While certain novel features of the invention have been disclosed herein, and are pointed out in the claims, it will be understood that various omissions, substitutions and changes may be made by those skilled in the art without departing from the spirit of the invention.

What is claimed is:

1. A machine for flanging and ribbing metal clad panels of the type which comprises a fibrous base sheet having a metal surfacing sheet bonded thereto, the base sheet having grooves cut therein forming a main section and flange forming sections, a corner of the base sheet being notched to define the ends of the flanges to be formed with the exposed corner metal having preformed fold defining lines therein, said machine including in combination, a die-block presenting downwardly inclined flange forming faces and an intermediate corner forming face, a knife-like element extending diagonally inwardly from the corner shaping face to positively initiate inward collapse folding of the exposed corner metal, and pressure means for exerting pressure against the main section of the panel to force the panel into the confines of said die-block and substantially simultaneously force the metal faces of the flange sections into forming contact with the shaping faces of said die-block whereby the corner metal is formed into an inwardly extending plural ply rib wedged between the adjacent ends of the flange sections of the base sheet.

2. A machine for flanging and ribbing metal clad panels of a type which comprises a fibrous base sheet having a metal surfacing sheet bonded thereto, the base sheet having grooves cut therein forming a main section and flange forming sections, a corner of the base sheet being notched to define the ends of the flanges to be formed with the exposed corner metal having preformed fold defining lines therein, said machine including in combination, a die-block having downwardly inclined flange shaping faces, a corner shaping face, and substantially vertical riser faces extending downwardly from the lower edge of said flange shaping faces, a knife-like element extending diagonally inwardly from said corner shaping face to positively initiate inward collapse folding of the exposed corner metal, and pressure means including a pressure block for exerting downward pressure against the main section of the panel to force the panel into the confines of said die-block and substantially simultaneously force the metal corner section and the metal faces of the flange sections into forming contact with the shaping faces of said die-block whereby the exposed metal corner is formed into an inwardly extending plural-ply rib wedged between adjacent ends of the flange sections of the base sheet, said pressure block having its peripheral edges substantially out of contact with the inside faces of said flange sections during the shaping operation.

3. A machine for flanging and ribbing metal clad panels of a type which comprises a composition base sheet having a metal surfacing sheet bonded thereto, the base sheet having grooves cut therein forming a main center section and flange forming sections, the corners of the base sheet being notched to define the ends of the flanges to be formed with exposed metal corners having preformed fold defining lines therein, said machine including in combination, a shaping frame having a confined inner area to receive the panel therein, said shaping frame having downwardly inclined shaping faces for shaping the metal corner sections and for shaping the flanges to extend at a predetermined angle to the center section of the panel, said shaping frame presenting substantially vertical riser faces extending downwardly from the lower edge of the inclined shaping faces with the area defined by said riser faces being sufficient to receive and contain the main center section of the panel, a knife-like element extending diagonally inwardly from each corner shaping section operative to positively initiate inward collapse folding of the adjacent exposed corner metal, and pressure means for applying pressure to the center section of the panel to force the panel into the space defined by the shaping faces of said shaping frame and substantially simultaneously force the metal corner sections and the metal faces of the flange sections into forming contact with the shaping faces of said shaping frame whereby the exposed metal corners are forced inwardly to form inwardly extending plural-ply corner ribs wedged between adjacent ends of the flange sections of the base sheet during shaping of said flange sections.

4. A machine for flanging and ribbing metal clad panels of the type which comprises a composition base sheet having a metal surfacing sheet bonded thereto, the base sheet having grooves cut therein defining a main section and flange forming sections, the corners of the base sheet being notched to define the ends of the flanges to be formed with the exposed metal corners having preformed fold defining lines therein, said machine including in combination, a shaping frame presenting downwardly inclined shaping faces which together define the outer contour and shape of the corner sections and flange sections of the panel to be formed, said shaping frame defining a cavity space below the lower edge of the shaping faces of sufficient area to receive the center section of the panel to be formed, a knife-like element extending diagonally inwardly from each shaping corner of the shaping frame operative to positively initiate inward collapse folding of the adjacent exposed corner metal, and pressure means for forcing said panel into the space defined by the shaping faces of said shaping frame whereby said metal corners are formed into inwardly extending plural-ply ribs wedged between the adjacent ends of the formed flange sections of the base sheet.

5. A machine for flanging and ribbing metal clad panels of a type which comprises a composition base sheet having a metal surfacing sheet bonded thereto, the base sheet having grooves cut therein defining a main section and flange forming sections, the corners of the base sheet being notched to define the ends of the flanges to be formed with the exposed metal corners having preformed fold defining lines therein, said machine including in combination, a shaping frame presenting downwardly inclined shaping faces and substantially vertical riser faces extending from the lower edge of said shaping faces, said shaping faces together defining the outer contour and shape of the corner sections and flange sections of the panel to be formed, a knife-like element extending diagonally inwardly from each corner shaping face operative to positively initiate inward collapse folding of the adjacent exposed corner metal, pressure means for forcing said panel into the space defined by the shaping faces of said shaping frame whereby said metal corners are formed into inwardly extending plural-ply ribs wedged between the adjacent ends of the adjacent flange sections of the base sheet, and a resiliently mounted ejector plate contained within the confines of said riser faces for ejecting the fully flanged panel from its pressed position within said shaping frame.

6. A machine for flanging and ribbing metal clad panels of a type which comprises a base sheet bonded to a metal sheet, the base sheet having grooves cut therein forming a main center section and flange forming sections, the corners of the base sheet being notched to define the ends of the flanges to be formed with the exposed metal corners having preformed fold defining lines therein, said machine including a shaping frame presenting flange forming faces and intermediate corner forming faces shaped to conform to the contour of the panel corners and panel flanges to be formed, said shaping frame also presenting substantially vertical riser faces extending downwardly from the lower edge of said flange forming faces, a knife-like element extending diagonally inwardly from each corner forming face operative to positively initiate inward collapse folding of the adjacent exposed corner metal, a pressure block adapted to seat on the center section of the panel and out of contact with the inside faces of the flange sections thereof, pressure applying means for manipulating said pressure block to drive said panel into the space defined by the forming faces of said shaping frame whereby said forming faces of said shaping frame operate to shape the flanges of the panel and shape said metal corners into inwardly extending plural ply ribs wedged between the adjacent ends of the flange sections of the base sheet, and a resiliently mounted ejector plate contained within the confines of said riser faces for ejecting the fully flanged panel from its pressed position within said shaping frame.

7. A machine for flanging and ribbing metal clad panels of the type which comprises a base sheet bonded to a metal sheet, the base sheet having grooves cut therein forming a main center section and flange forming sections, the corner of the base sheet being notched to define the ends of the flanges to be formed with the exposed corner metal having preformed fold defining lines therein, said machine including a shaping frame presenting a corner forming face and adjacent flange forming faces shaped to conform to the contour of the panel corner and adjacent flanges to be formed, a knife-like element extending diagonally inwardly from said corner forming face operative to positively initiate inward collapse folding of the exposed corner metal, a pressure block adapted to seat on the center section of the panel and out of contact with the inside faces of the panel corners during the forming operation, means for applying pressure to said pressure block to drive said panel into shaping contact with the forming faces of said shaping frame whereby said shaping frame operates to shape the panel flanges and insert the excess metal at the corner of the panel inwardly to form a corner reinforcing rib wedged between the adjacent ends of the flange sections of the base sheet, and a resiliently mounted ejector plate within said shaping frame for ejecting the fully flanged panel from its pressed position within said shaping frame.

GLENN H. NORQUIST.

REFERENCES CITED

The following references are of record in the file of this patent:

UNITED STATES PATENTS

| Number | Name | Date |
|---|---|---|
| 50,410 | Wood | Oct. 10, 1865 |
| 219,594 | Mueller | Sept. 16, 1879 |
| 340,659 | Churchill | Apr. 27, 1886 |
| 843,854 | Waterman | Feb. 12, 1907 |

FOREIGN PATENTS

| Number | Country | Date |
|---|---|---|
| 19,085 | Great Britain | Apr. 13, 1909 |